United States Patent [19]
Graf et al.

[11] Patent Number: 5,504,424
[45] Date of Patent: Apr. 2, 1996

[54] VARIABLE RELUCTANCE SENSOR UTILIZING A MAGNETIC BOBBIN

[75] Inventors: Craig R. Graf, Elkhart; Ronald J. Wolf, Goshen, both of Ind.

[73] Assignee: Durakool, Inc., Elkhart, Ind.

[21] Appl. No.: 70,083

[22] Filed: May 28, 1993

[51] Int. Cl.⁶ .......................... G01P 3/488; H02K 21/38; G01B 7/30; G01B 7/14
[52] U.S. Cl. ...................... 324/174; 324/207.25
[58] Field of Search ............... 324/174, 207.16, 324/207.25, 207.22, 173

[56] References Cited

U.S. PATENT DOCUMENTS

| | | |
|---|---|---|
| 364,877 | 2/1932 | Sutton . |
| 2,304,866 | 12/1942 | Wall . |
| 3,324,434 | 6/1967 | Vassalotti . |
| 3,469,662 | 9/1969 | Dewar . |
| 3,551,712 | 12/1970 | Jones et al. ............................. 324/174 |
| 3,717,833 | 2/1973 | Kubota et al. . |
| 3,719,841 | 3/1973 | Ritsema . |
| 3,721,968 | 3/1973 | Gee . |
| 3,772,549 | 11/1973 | Cumming . |
| 3,895,333 | 7/1975 | Cressman . |
| 3,947,711 | 3/1976 | Presley et al. . |
| 3,952,315 | 4/1976 | Cecco . |
| 3,961,214 | 6/1976 | Lokkart . |
| 4,067,541 | 1/1978 | Hunter . |
| 4,129,107 | 12/1978 | Boyer . |
| 4,161,665 | 7/1979 | Buck et al. . |
| 4,256,986 | 3/1981 | Anderson ............................. 324/174 |
| 4,289,722 | 9/1981 | Tranbarger . |
| 4,471,652 | 9/1984 | Yasuhara et al. . |
| 4,485,796 | 12/1984 | Boyer . |
| 4,497,495 | 2/1985 | Christiansen . |
| 4,501,298 | 2/1985 | Inada et al. . |
| 4,626,781 | 12/1986 | Forkel . |
| 4,658,168 | 4/1987 | Belart et al. . |
| 4,670,715 | 6/1987 | Fuzzell . |
| 4,687,961 | 8/1987 | Horber . |
| 4,698,609 | 10/1987 | Goehle et al. . |
| 4,700,133 | 10/1987 | Day . |
| 4,709,669 | 12/1987 | Wissmann et al. . |
| 4,713,570 | 12/1987 | Mastromattei . |
| 4,720,078 | 1/1988 | Nakamura et al. . |
| 4,721,864 | 1/1988 | Goossens . |
| 4,725,749 | 2/1988 | Wuthrich . |
| 4,733,249 | 3/1988 | Iwamoto et al. . |
| 4,828,229 | 5/1989 | Fannin et al. . |
| 4,842,352 | 6/1989 | Sasaki et al. . |
| 4,845,837 | 7/1989 | Lloyd . |
| 4,904,175 | 2/1990 | Horibe et al. . |
| 4,904,936 | 2/1990 | Richmond . |
| 4,939,398 | 7/1990 | Lloyd . |

(List continued on next page.)

FOREIGN PATENT DOCUMENTS

| | | |
|---|---|---|
| 2811746 | 10/1978 | Germany . |
| 584249 | 7/1976 | U.S.S.R. . |

Primary Examiner—Walter E. Snow
Attorney, Agent, or Firm—Fitch, Even, Tabin & Flannery

[57] ABSTRACT

The present invention relates to a variable reluctance sensor which includes a coil of wire defining a pair of output terminals, one or more stators or pole pieces, and an injection molded bobbin formed from a magnetic material and a polymer binder for carrying the coil wire. The injection molded bobbin magnet enables the size and, thus, the strength of the magnet to be increased while not increasing the overall space requirements of the sensor. In addition, the injection molding enables the inner diameter of the bobbin to be formed in the image of the toothed target wheel relatively easily and inexpensively to additionally improve the output voltage of the sensor. In order to facilitate assembly of the sensor, the bobbin can be formed with integral tabs adapted to be received in corresponding notches formed in the stators, which allows for relatively quick and easy orientation of the stator relative to the bobbin. The output terminals are overmolded relative to the bobbin and stators, which secures the assembly together and also seals one side of the sensor. Axially extending members are radially spaced about an inner diameter of the bobbin to facilitate orientation of the sensor relative to a target wheel in a wheel hub by an automated manufacturing process.

15 Claims, 8 Drawing Sheets

U.S. PATENT DOCUMENTS

| | | |
|---|---|---|
| 4,939,456 | 7/1990 | Morelli et al. . |
| 5,010,290 | 4/1991 | Foster . |
| 5,023,546 | 6/1991 | Pawlak et al. . |
| 5,111,098 | 5/1992 | Peck et al. .............................. 324/174 |
| 5,144,233 | 9/1992 | Christenson et al. . |
| 5,145,402 | 9/1992 | Plyler et al. . |
| 5,172,984 | 12/1992 | Lederman . |

VARIABLE RELUCTANCE SENSOR UTILIZING A MAGNETIC BOBBIN

BACKGROUND OF THE INVENTION

1. Field of the Invention

The present invention relates to a variable reluctance sensor for sensing moving ferrous targets and, more particularly, to a variable reluctance sensor for use in applications where space is relatively limited which includes a coil of wire, one or more pole pieces or stators and an injection molded permanent magnet formed as a bobbin for carrying the coil of wire which enables the sensor to generate a relatively higher output signal level than known sensors in a relatively limited amount of space.

2. Description of the Prior Art

Variable reluctance sensors (also known as "magnetic pickups") are known in the art for sensing both linear and rotary motion. Examples of various variable reluctance sensors are disclosed in U.S. Pat. Nos. 2,304,866; 3,469,662; 3,719,842; 3,721,968; 3,722,549; 3,947,711; 3,961,214; 4,161,665; 4,471,652; 4,626,781; 4,558,158; 4,700,133; 4,721,864; 4,772,815; 5,023,546; and 5,023,547. Such sensors are normally self-powered and generally include a permanent magnet, a coil of wire wound about a bobbin and one or more pole pieces. In operation, movement of a ferrous target relative to the sensor causes a voltage to be induced at the output terminals of the coil of wire that is proportional to the time rate of change of magnetic flux lines cutting the coil. The time rate of change of magnetic flux lines cutting the coil varies as a function of the reluctance of the air gap which, in turn, varies as a function of the distance of the magnetic target relative to the pole pieces.

Such sensors have been known to be used to sense the wheel speed of vehicles equipped with anti-lock brake systems (ABS), for example, as disclosed in U.S. Pat. Nos. 3,469,662; 3,719,841; 3,772,549; 5,023,546 and; 5,023,547. In such applications, a sensor target is normally configured as a toothed wheel and mechanically coupled to rotate with one of the vehicle wheels, while the sensor is normally mounted to the wheel hub adjacent the target. With such a configuration, rotation of wheel, and, in turn, the toothed wheel, results in output pulses from the coil having a frequency proportional to the speed of the vehicle wheel.

There are several problems with such variable reluctance sensors. For example, some known variable reluctance sensors are relatively expensive to manufacture. In addition, applications where the sensor is used to sense the speed of a vehicle wheel, the sensor is physically attached to the wheel hub, for example, as described in U.S. Pat. No. 5,010,290, which results in other known problems. For example, in such applications, the sensor can be relatively difficult to install to a wheel hub by an automated manufacturing process. In addition and probably most important is that the available space for the sensor in such an application is relatively limited. The physical space limitation, in turn, limits the size of the magnet and, in turn, the strength (e.g. gauss output) of the magnet. Since the output voltage level of the sensor is a function of the magnet strength, such variable reluctance sensors have been known to produce relatively low output signal levels. Because of the electrical noise level in certain applications, such low output signal levels are undesirable.

SUMMARY OF THE INVENTION

It is an object of the invention to solve various problems of the prior art.

It is yet another object of the present invention to provide a variable reluctance sensor with an increased output signal level without increasing the size requirements relative to known sensors.

It is yet another object of the present invention to provide a variable reluctance sensor which includes a coil of wire, one or more pole pieces or stators, and an injection molded magnet formed as a bobbin.

It is yet a further object of the invention to provide a variable reluctance sensor that is relatively easier to assemble than known variable reluctance sensors.

It is yet a further object of the invention to provide a variable reluctance sensor that is relatively easier to install to a wheel hub by automated manufacturing processes than known sensors.

Briefly, the present invention relates to a variable reluctance sensor which includes a coil of wire defining a pair of output terminals, one or more stators or pole pieces, and an injection molded bobbin formed from a magnetic material and a polymer binder for carrying the coil wire. The injection molded bobbin magnet enables the size and, thus, the strength of the magnet to be increased while not increasing the overall space requirements of the sensor. In addition, the injection molding enables the inner diameter of the bobbin to be formed in the image of the toothed target wheel relatively easily and inexpensively to additionally improve the output voltage of the sensor. In order to facilitate assembly of the sensor, the bobbin can be formed with integral tabs adapted to be received in corresponding notches formed in the stators, which allows for relatively quick and easy radial orientation of the stator relative to the bobbin. A pair of output terminals are connected to the coil and overmolded relative to the bobbin and stators, which secures the assembly together and also closes one side of the sensor. Axially extending molded members are radially spaced about an inner diameter of the bobbin to facilitate concentric orientation of the sensor relative to a target wheel in a wheel hub by an automated manufacturing process.

DESCRIPTION OF THE DRAWINGS

These and other objects of the present invention will be readily apparent with reference to the attached description and following drawing wherein.

DETAILED DESCRIPTION

The variable reluctance sensor in accordance with the present invention is particularly suited for applications where the available space for the sensor is relatively limited, such as in an application as a vehicle wheel speed sensor used primarily in vehicles equipped with anti-lock brake systems (ABS), for example, as disclosed in U.S. Pat. No. 5,010,290. However, although the variable reluctance sensor in accordance with the present invention will be hereinafter described and illustrated in an application as a vehicle wheel speed sensor, for example, for use in an ABS system, it will be clear to those of ordinary skill in the art that the invention is not so limited.

The variable reluctance sensor, in accordance with the present invention, generally identified with the reference numeral 20, is adapted to provide an increased output signal level without increasing the overall space requirements of the sensor relative to known variable reluctance sensors. An important aspect of the invention, as will be discussed in more detail below, is an injection-molded bobbin formed from magnetic material (e.g., "bobbin magnet") that is axially magnetized and formed with a center bore. The injection-molded bobbin magnet enables the size of the magnet to be increased and, thus, the output signal level of the sensor to be increased without increasing the overall space requirements of the sensor. More particularly, in known vehicle wheel sensors, a separate magnetically non-conductive bobbin, for example, a plastic bobbin, and a sintered or plastic magnet are used and disposed in an end cap, adapted to be assembled to a wheel hub portion of a wheel bearing assembly. In those applications, the sintered or plastic magnet is normally disposed in a plane adjacent the plane of the bobbin and, thus, limits the available space for the magnet. Due to the space limitations of such known sensors, there is little or no space available to increase the size of the magnet in order to increase the output voltage level of the sensor. The variable reluctance sensor 20 solves this problem by eliminating the need for a separate magnet and separate bobbin. In addition, since the injection-molded bobbin magnet is axially magnetized and formed with a centrally disposed bore, a target wheel can be disposed within the bore to further conserve space within the sensor to optimize the size and, thus, the magnet strength of the injection-molded magnet, which, in turn, provides an increased output level from the sensor 20.

Figure 1:
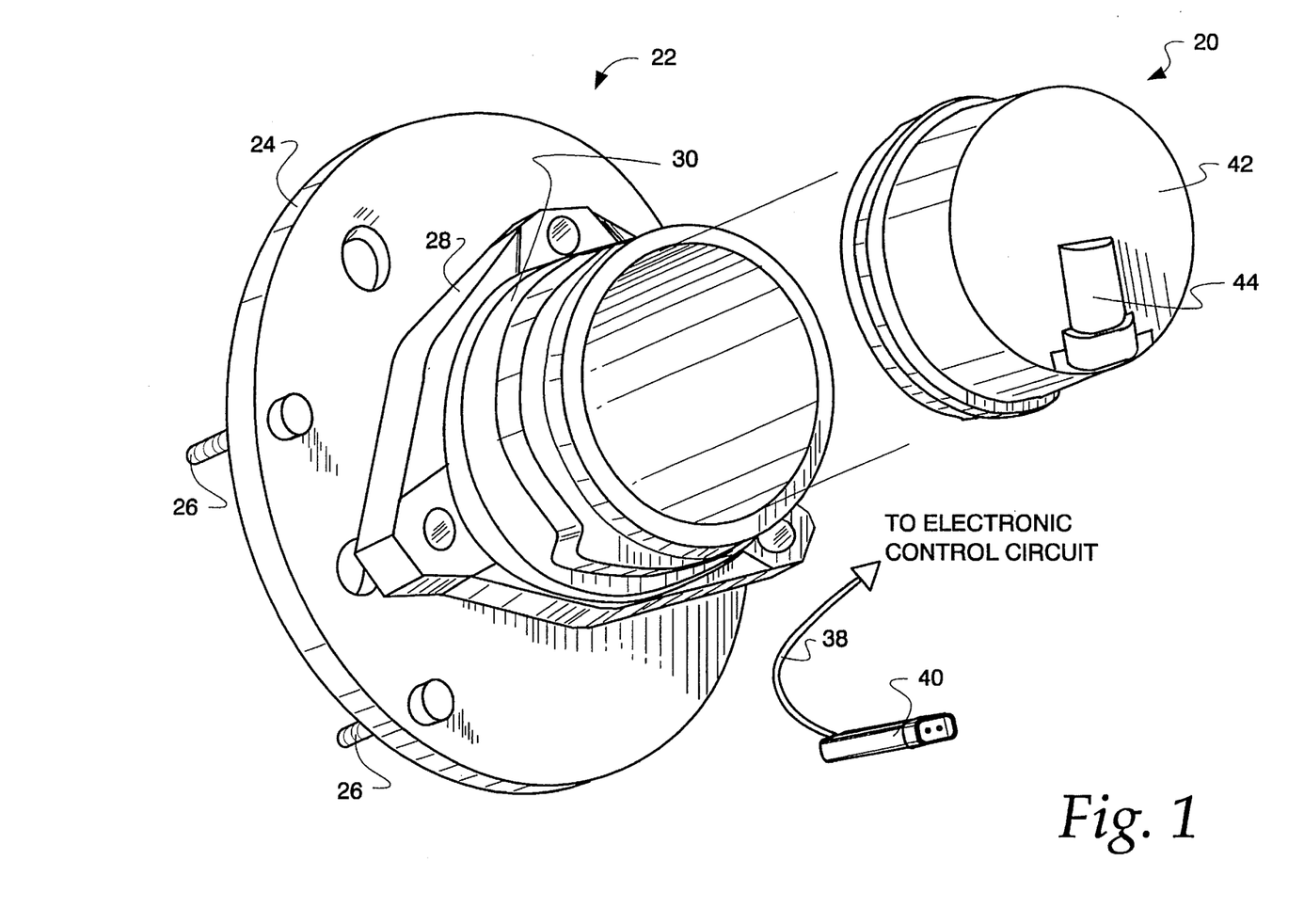
FIG. 1 is a perspective view of a known wheel bearing assembly for a non-driven wheel of a vehicle which illustrates an extending electrical cable and connector for attachment of an electronic control circuit (not shown) to a variable reluctance sensor in accordance with the present invention, shown disassembled from a wheel hub portion of the wheel bearing assembly.
Figure 2:
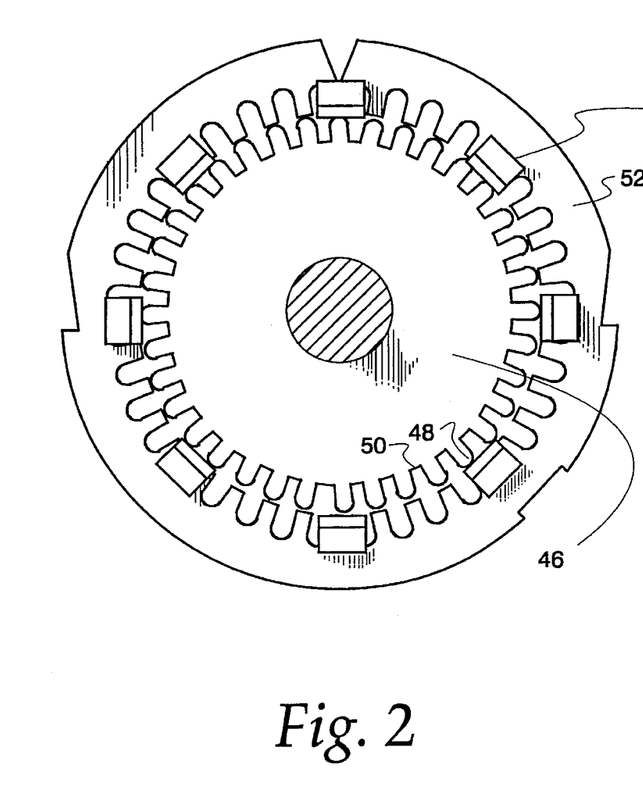
FIG. 2 is a front elevational view of a target wheel, shown attached to a shaft shown with the teeth of the target wheel aligned with the teeth of a stator, which forms a portion of the sensor in accordance with the present invention.
Figure 3:
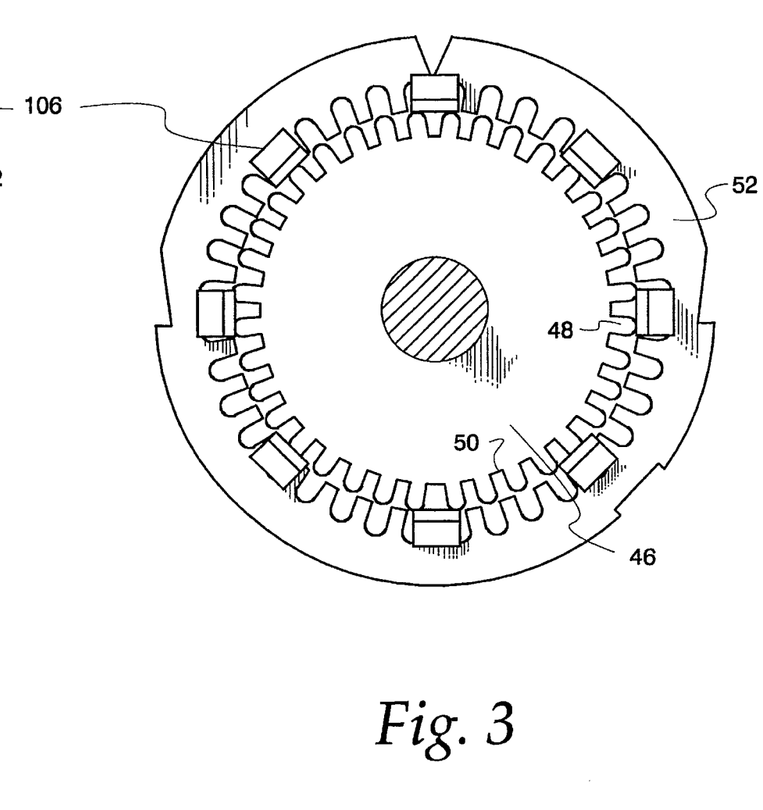
FIG. 3 is a similar to FIG. 2 but shown with the teeth of the target wheel aligned with notches in the stator.

With reference to the drawings, FIGS. 1–3 illustrate the attachment of the sensor 20 to a conventional wheel bearing assembly 22 for applications in which the sensor 20 is used as a wheel speed sensor. In particular, FIG. 1 is a perspective view of a conventional wheel bearing assembly 22 for an automobile, illustrating a side opposite the side that the tire and wheel are normally mounted. The wheel bearing assembly 22 includes a wheel flange 24 with a plurality of lugs 26 for securing a tire and wheel assembly (not shown) thereto. The wheel bearing assembly 22 also includes a concentrically disposed mounting flange 28 with a centrally disposed hub 30. One end of a cable 38 is adapted to be connected to an electronic control system (not shown), while the other end of the cable is provided with a weather-proof electrical connector 40. The electrical connector 40, as will be discussed in more detail below, is adapted to be connected to the sensor 20 in accordance with the present invention. The cable 38, electrical connector 40 and the electronic control circuit do not form any part of the present invention.

The sensor assembly 20 is housed in an end cap 42 that is adapted to be mounted in the wheel hub portion 30 by an interference or friction fit for use on non-driven wheels. The end cap 42 includes a well or receptacle portion 44 for connecting to the electrical connector 40 in order to connect the sensor 20 to the electronic control circuit. In applications for driven wheels, the sensor housing may be formed as a ring-like structure.

The variable reluctance sensor assembly 20 is adapted to sense the angular velocity of a ferrous target 46, for example, a toothed-wheel attached to a vehicle wheel, as shown in FIG. 2, for example, as disclosed in U.S. Pat. Nos. 3,719,841, 5,023,546 and 5,023,547, hereby incorporated by reference. The ferrous target 46 is formed with a plurality of alternating teeth 48 and notches 50 about its periphery. The angular position of the teeth 48 and notches 50 in the toothed wheel 46 with respect to corresponding teeth and notches formed in one or more stators 52 (which form a portion of the variable reluctance sensor assembly 20) determine the reluctance of the air gap between the ferrous target 46 and the stator 52.

Figure 4A:
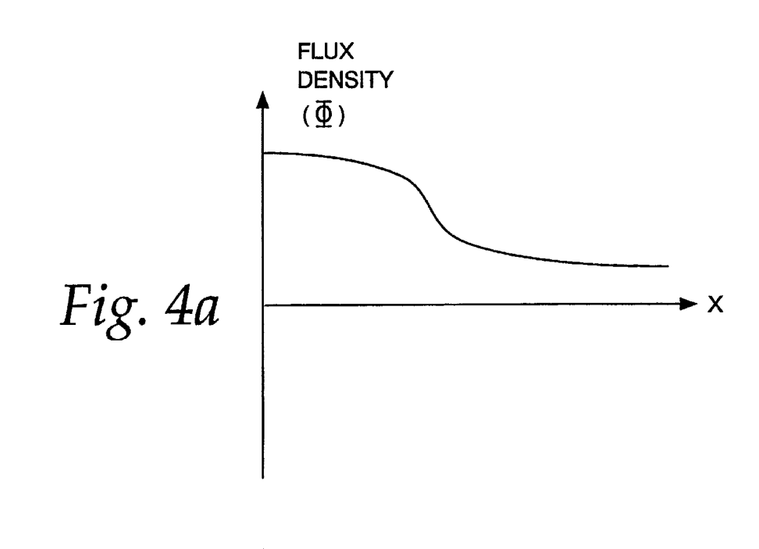
FIG. 4A is a curve illustrating flux density as a function of relative distance (X) between teeth on the stator wheel and teeth on the ferrous target wheel.
Figure 4B:
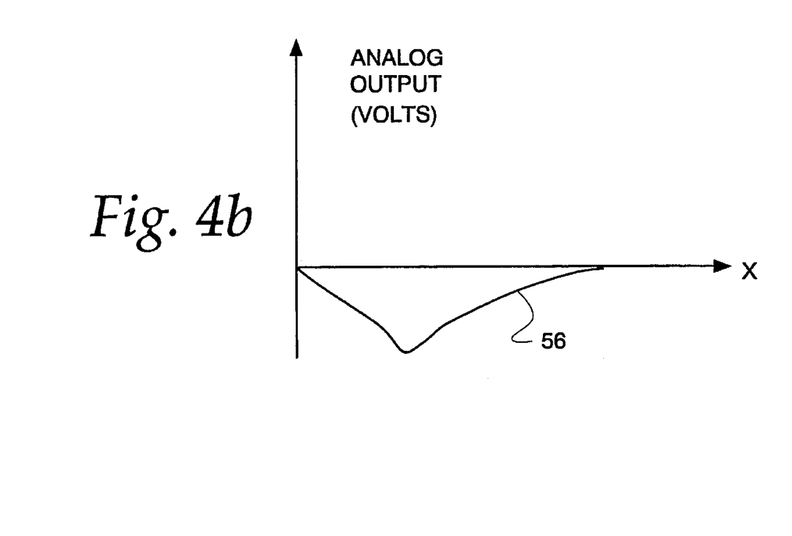
FIG. 4B is a curve illustrating analog output voltage as a function of X at a predetermined angular velocity of the target wheel relative to the stator.
Figure 7:
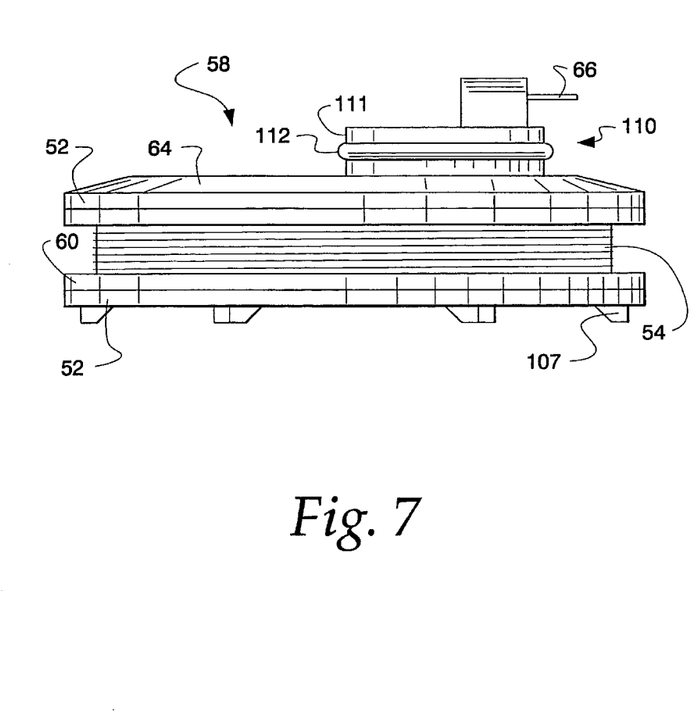
FIG. 7 is an elevational view of the sensor sub-assembly illustrated in FIG. 6.

As shown in FIG. 2, the corresponding teeth of the stator 52 and target wheel 46 are aligned. During this condition, as shown in FIG. 4A by the point $\phi_{max}$, the flux density through the air gap is at a maximum while the reluctance at a minimum. When the corresponding teeth 48 on the ferrous target wheel 46 become aligned with the notches on the stator 52, as shown in FIG. 3, the flux density across the air gap is at a minimum and the reluctance across the air gap is at a maximum, as indicated by the points $\phi_{min}$ in FIG. 4A. The change in flux density as the target wheel 46 rotates with respect to the stator induces a voltage across a coil 54 (FIG. 7). In particular, the rate of change of the flux density cutting through the coil 54 induces a voltage in the output terminals of the coil 54 that is proportional to the rate of change of flux density per unit time. This relationship is shown in FIG. 4B wherein the vertical axis indicates the output voltage induced in the coil 54 as a function of the angular velocity of the ferrous target wheel 46 relative to the stator 52. For a given angular velocity of the ferrous target 46 relative to the stator 52, a voltage pulse 56 is induced across the coil 54 as a function of the angular velocity of the ferrous target 46 and the displacement of the teeth 48 and notches 50 on the target 46 relative to the corresponding teeth and notches on the stator 52. The frequency of the pulses 56 is proportional to the speed of the wheel. The number of teeth on both the ferrous target wheel 46 and the stator 52 control the number of pulses per revolution of the wheel. In general, the number of teeth is selected according to the desired resolution of the sensor 20. Generally speaking, the more teeth that are provided, the higher the resolution of the sensor and, hence, the more accuracy. In addition, by providing teeth about the periphery of the stator 52 which correspond with an identical number of (or multiple thereof) teeth on ferrous target wheel 46, the output signal of the sensor 20 will be fairly uniform even though the ferrous target wheel 46 may not be perfectly concentric with respect to the stator 52.

Figure 6:
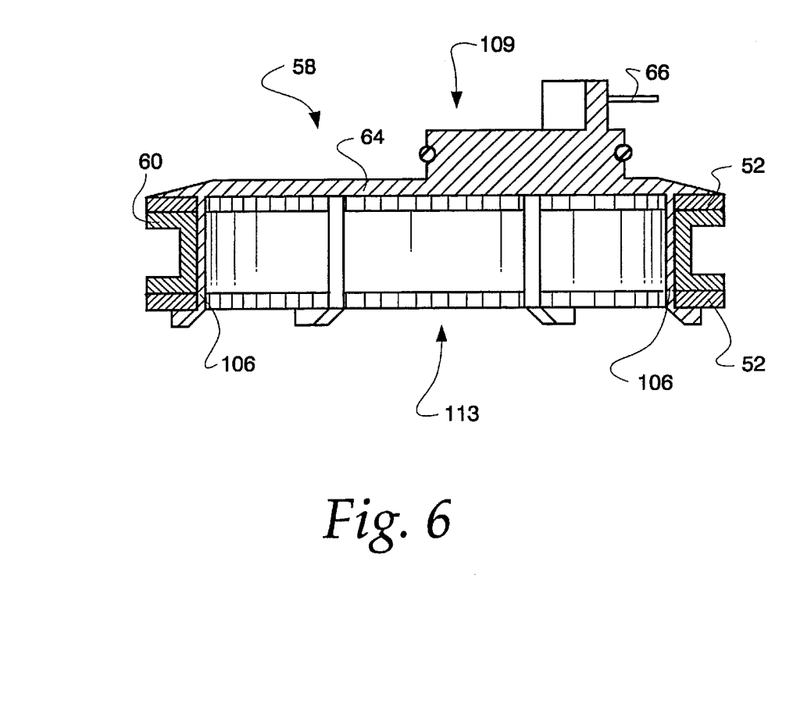
FIG. 6 is a sectional view of the sensor sub-assembly in accordance with the present invention.
Figure 8:
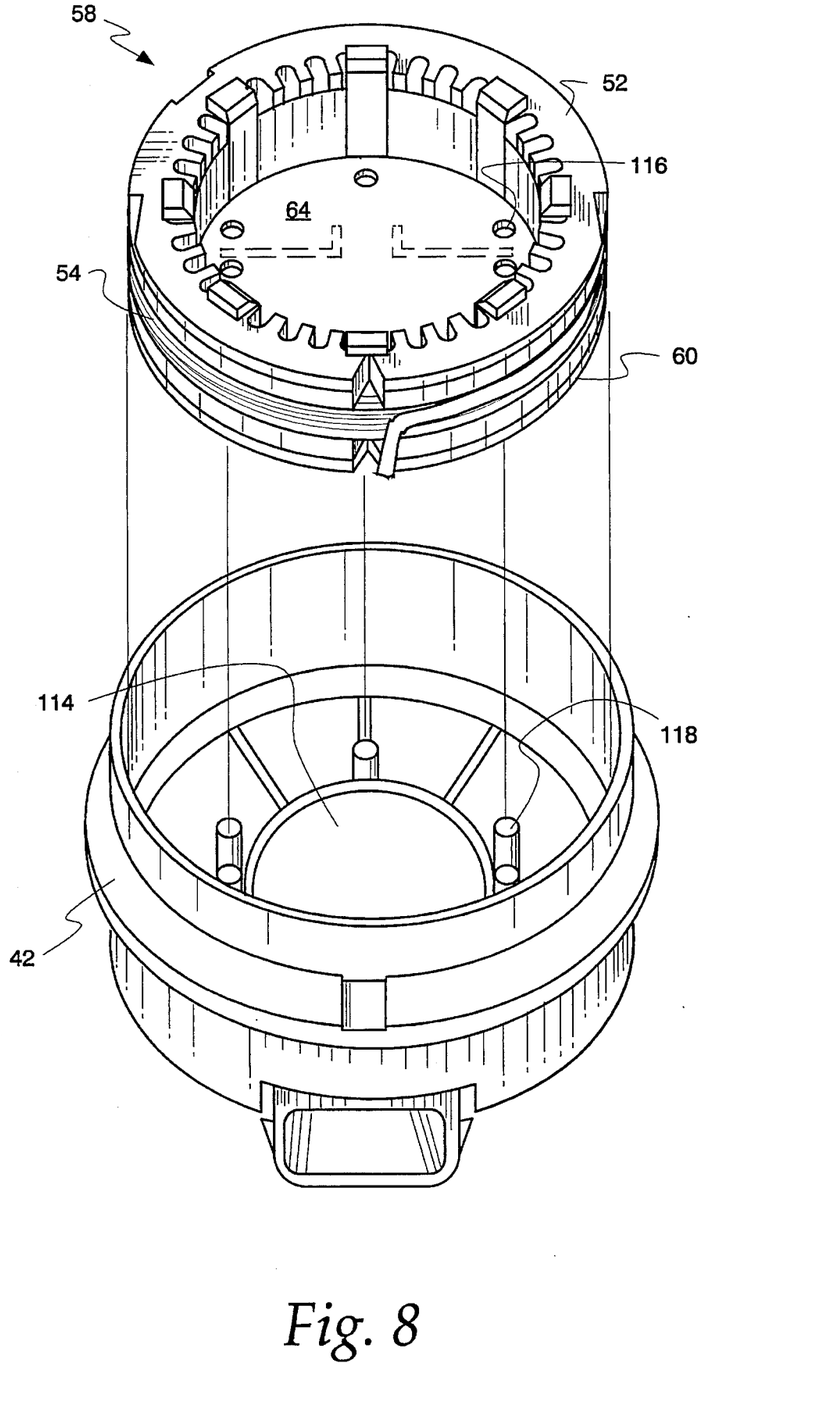
FIG. 8 is an exploded perspective view illustrating the sensor sub-assembly and an end cap in accordance with the present invention.

The variable reluctance sensor 20, in accordance with the present invention, includes a sensor sub-assembly 58 and a housing formed as an end cap 42 (FIG. 8). The sensor sub-assembly 58 includes one or more stators or pole pieces 52, a bobbin 60, a coil of wire 54, an interconnecting member 64 and a pair of output terminals 66 (FIG. 6). The relatively few component parts of the variable reluctance sensor 20, in accordance with the present invention, reduces the cost of manufacturing the sensor 20, as well as provides additional benefits which derive from forming the permanent magnet in the form of a bobbin from an injection molded process. As will be discussed in more detail below, the injection molded magnet bobbin 60 not only eliminates the need for a separate bobbin, thus providing additional space for the permanent magnet to increase the output signal level of the sensor, but also simplifies the manufacturing process and, thus, the overall cost of the sensor.

Figure 11:
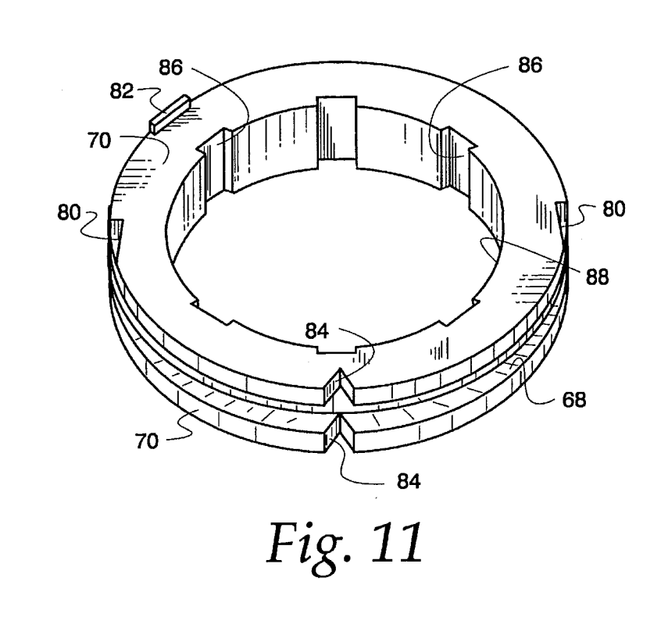
FIG. 11 is a perspective view of a magnet bobbin in accordance with the present invention.
Figure 12:
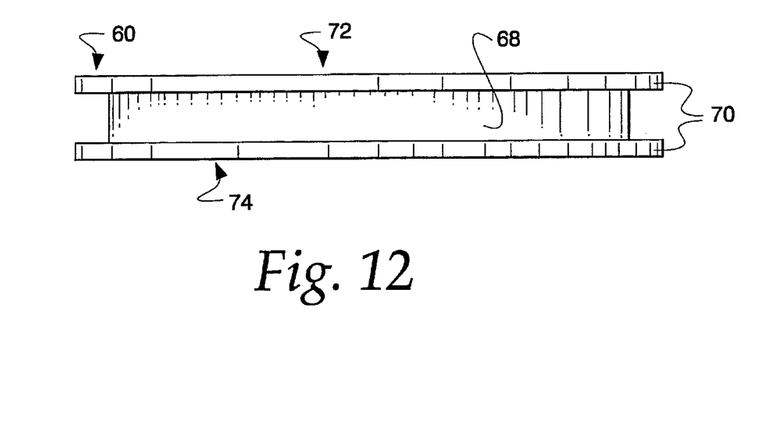
FIG. 12 is an elevational view of the magnet bobbin illustrated in FIG. 11.

In particular, the bobbin magnet 60 is formed in a ring-shape from a magnet material, such as strontium ferrite in a polyamide 6 nylon resin or carded by another polymer binder, such as a resin, plastic, thermoplastic, thermoset plastic or a 6/6 nylon material from an injection-molded process. The bobbin 60 is axially magnetized to enable the stator 52 or pole piece to be disposed adjacent each pole. The injection molding process for forming the bobbin 60 also enables various features to be integrally molded therein that would otherwise either not be possible or be too expensive with a conventional sintered magnet. For example, the bobbin 60 is formed with a circumferential groove 68 which defines a pair of spaced apart circular sidewalls 70 on opposing edges 72, 74 of the bobbin 60 (FIGS. 11 and 12). The circumferential groove 68 forms a core for the coil of wire 54. The opposing ends 76 and 78 (FIG. 9) of the coil 54 are then terminated, for example, by soldering, to the output terminals 66 disposed on one side of the bobbin 60.

Figure 13:
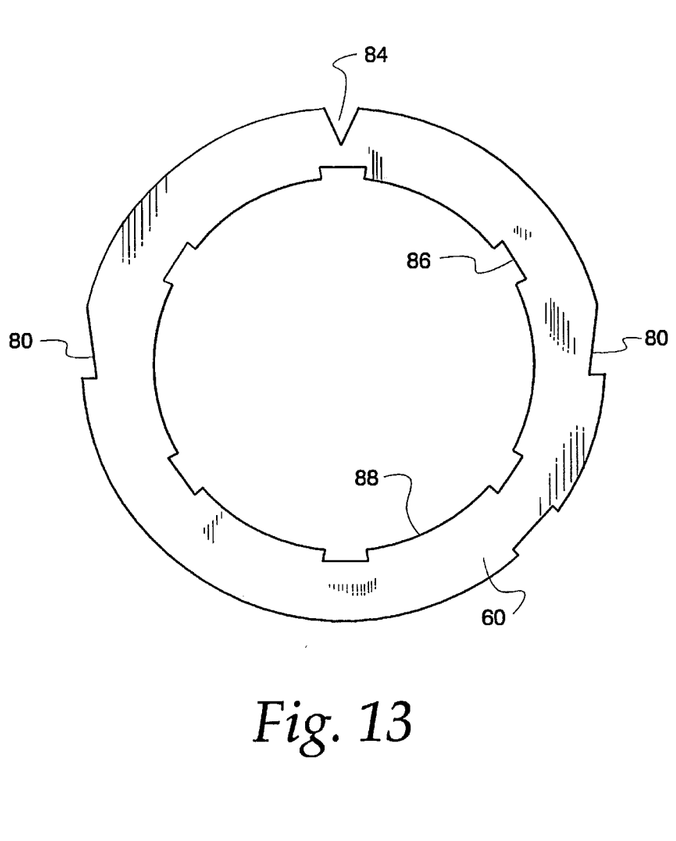
FIG. 13 is a plan view of the magnet bobbin illustrated in FIG. 11.

A pair of diametrically opposed notches 80 (FIGS. 9 and 13) are formed on each side 72, 74 of the bobbin 60. These notches 80 act as guides for the ends 76, 78 (FIG. 9) of the coil wire 54. By forming the notches 80 in each of the circular sidewalls 70 on each side 72, 74 of the bobbin 60, assembly of the sensor 20 by an automated manufacturing process is facilitated.

In addition to the notches 80, other features can be integrally molded into the bobbin 60 which either would not otherwise be possible with a sintered magnet or would be too expensive from a manufacturing standpoint. In particular, axially outwardly extending tabs 82 (FIG. 11) can be formed on each of the circular sidewalls 70 in order to facilitate radical orientation of the stators 52 relative to the bobbin 60.

As will be discussed in more detail below, the interconnecting member 64, as well as the assembly of the sensor sub-assembly 58, are formed by way of a known overmolding process. In order to facilitate the proper radial orientation of the bobbin 60 within the mold (not shown), generally V-shaped notches 84 (FIGS. 11 and 13) are formed in each of the circular sidewalls 70 and axially aligned. These V-shaped notches 84 are adapted to capture a pin (not shown) in the mold to provide proper radial orientation of the bobbin 60 within the mold.

Figure 5:
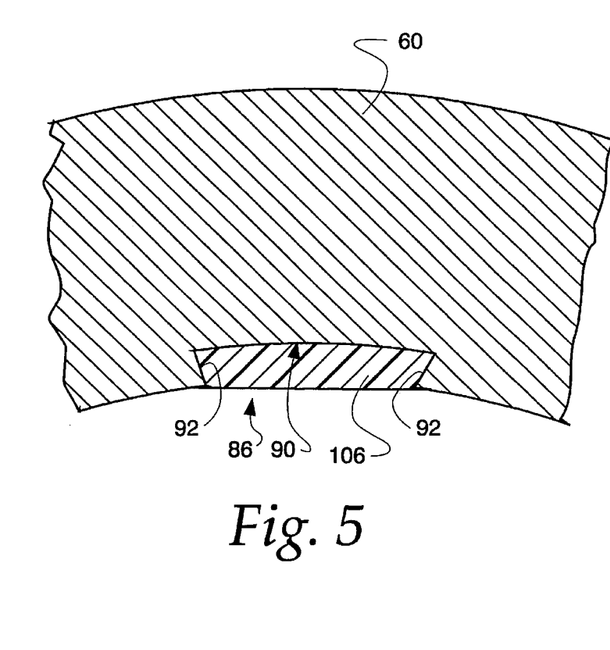
FIG. 5 is an enlarged partial plan sectional view of a sensor sub-assembly which forms a part of the present invention.

The bobbin 60 further incorporates features which facilitate assembly of the sensor 20 itself to a wheel bearing assembly 22 by way of an automated manufacturing process. In particular, a plurality of radially spaced axial notches 86 (FIGS. 11 and 13) are formed in the inner diameter 88 of the bobbin. These axial notches 86 enable the entire sensor sub-assembly 58 to be bound together as a result of the overmolding. In particular, as best shown in FIG. 5, each axial notch 86 defines a bight portion 90 and two depending sidewall portions 92. As shown, the depending sidewall portions 92 are convergent. This convergence of the depending sidewall portions 92 binds the sensor sub-assembly 58 together as a result of the overmolding, as will be discussed in more detail below.

Figure 14:
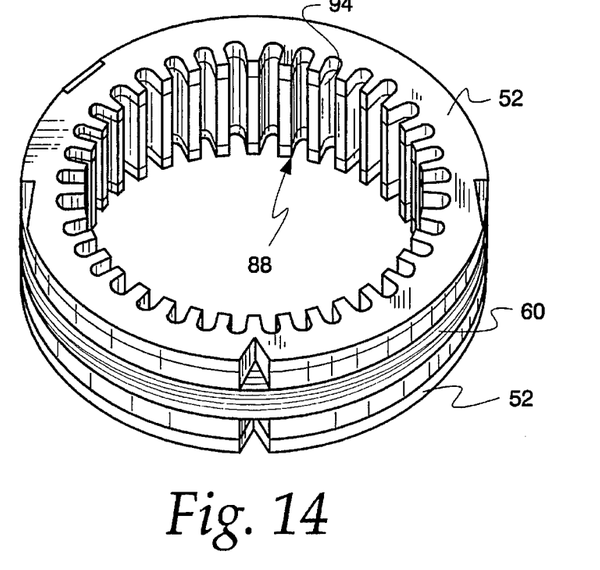
FIG. 14 is a perspective view of an alternate embodiment of the magnet bobbin illustrated in FIG. 11, shown sandwiched between a pair of stators.

Since the bobbin 60 is formed by injection molding, additional features can be integrally formed therein relatively quickly and easily, which can increase the output signal level of the sensor. In particular, as mentioned above, forming the bobbin 60 from a magnet material eliminates the need for a plastic bobbin and, thus, provides more space within the housing 42 for a larger magnet which increases the output signal level of the sensor 20. In addition, in an alternate embodiment of the invention as shown in FIG. 14, additional radially spaced axial notches 94 can be formed in the inner diameter 88 of the bobbin 60. These notches 94 may be integrally molded and configured to be axially aligned with the teeth and notches formed on the stators on the one or more stators 52, as shown in FIG. 14. By forming the notches 94 in the inner diameter 88 of the bobbin 60, an additional change of flux results as the ferrous target 46 is rotated. As discussed above, since the output signal level of the sensor 20 is directly proportional to the rate of change of flux lines or magnetic flux density cutting the coil 54, the output signal level of the sensor 20 is, thus, enhanced.

Figure 10:
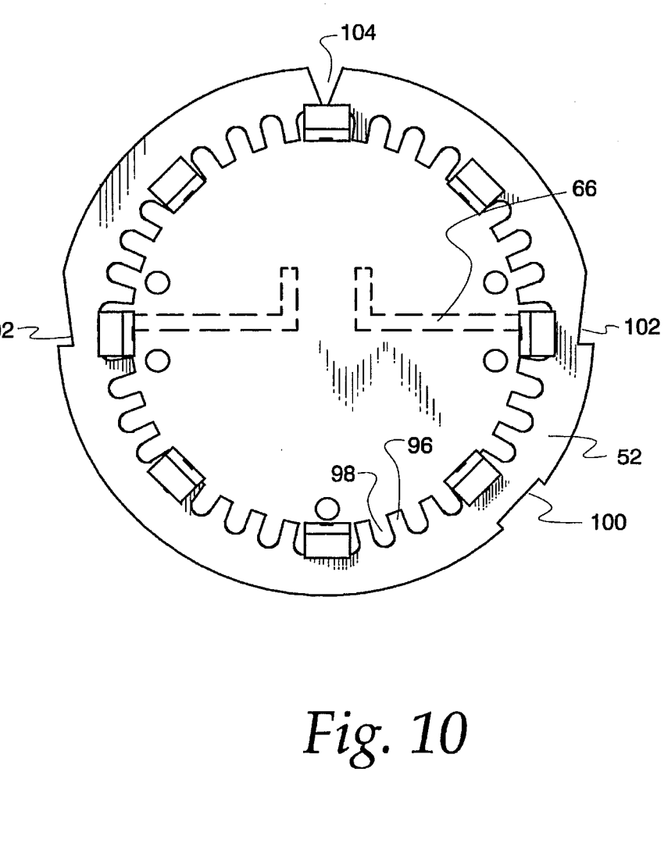
FIG. 10 is a bottom plan view of the sensor sub-assembly in accordance with the present invention.

As shown in FIGS. 7 and 8, the bobbin 60 may be sandwiched between two stators 52. Although the sensor 20 is operational with a single stator 52, the additional stator improves the output signal level of the sensor 20. These stators 52 are substantially identical in order to facilitate assembly of the sensor sub-assembly 58 by an automated manufacturing process, and are also formed to be relatively easily and quickly orientated radially with respect to the bobbin 60. In particular, each stator 52 is formed in a generally ring-shape from a ferro-magnetic material, such as low carbon steel. The inner diameter of each stator 52 is formed with a plurality of alternating teeth 96 and notches 98 (FIG. 10), selected to correspond to the teeth 48 and 50 in the ferrous target wheel 46, as discussed above. The outer diameter of the stator 52 is formed with a generally C-shaped notch 100 that is adapted to receive the tabs 82 (FIG. 11 ) formed on the circular sidewall 70 of the bobbin 60. This C-shape notch 100 functions to radially orientate the stator 52 with respect to the bobbin 60. In addition, a pair of diametrically opposite L-shaped notches 102 (FIG. 10) are formed in the outer diameter of the stator 52 that are adapted to be axially aligned with the notches 80 (FIG. 13) formed in the circular sidewall 70 of the bobbin 60. These L-shaped notches 102 (FIG. 10) are used to provide clearance to prevent the stator 52 from shorting out the coil 54. In order to facilitate assembly of the sensor sub-assembly 58 (FIG. 10), a generally V-shaped notch 104 is provided in the outer diameter of the stator 52. This V-shaped notch 104 is radially located to be axially aligned with the notch 84 formed in the circular sidewalls 70 of the bobbin 60 (FIG. 11 ). These V-shaped notches 84 and 104 facilitate radical orientation of the bobbin 60 and stators 52 in the mold.

Figure 9:
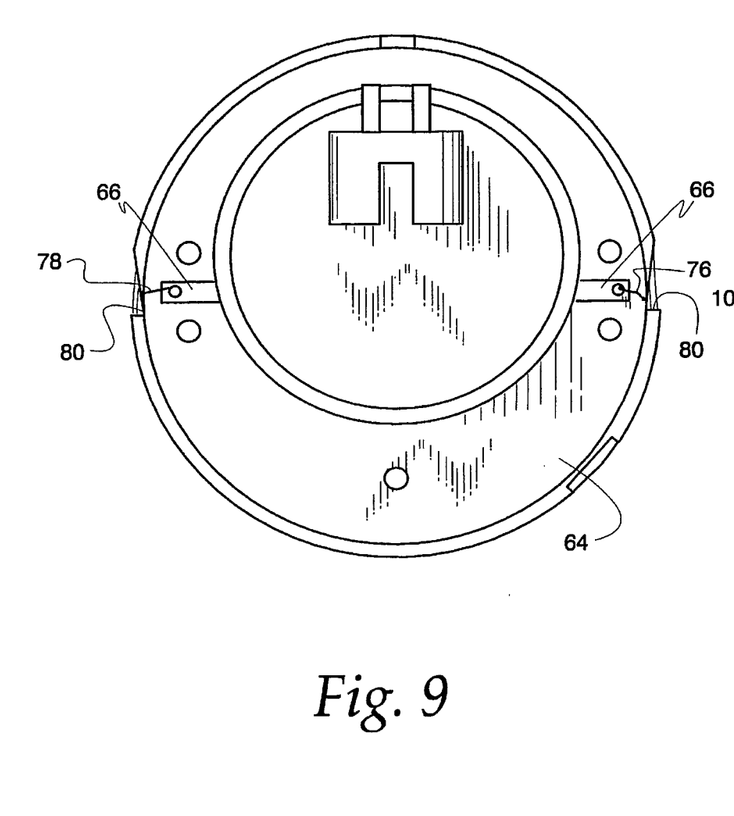
FIG. 9 is a top plan view of the sensor sub-assembly in accordance with the present invention.

The sensor sub-assembly 58 is assembled by radially orientating the one or more stators 52 with respect to the bobbin 60 such that the V-shaped notches 104 in the stators 52 are aligned with the V-shaped notch 84 in the circular sidewalls 70 of the bobbin 60. The bobbin assembly is then molded together by aligning the V-shaped notches 84 and 104 in the bobbin 60 and stators 52, respectively, with a pin (not shown) in the mold. The bobbin assembly is then overmolded with a plastic, such as 6/6 nylon. The coil 54 is then wound about the bobbin 60 such that the coil ends 76 and 78 are disposed adjacent the notches 80, 102 in the circular sidewalls 70 and stators 52, respectively. The coil ends 76 and 78 are then joined, for example by soldering, to the output terminals 66 (FIG. 9). As mentioned above, the overmolding functions to bind the stators 52, bobbin 60 and terminals 66 together. In particular, axial members 106 (FIG. 6) may be formed during the overmolding along the inner diameter 88 of the bobbin 60. Due to the configuration of the axial notches 86 (FIG. 11 ) in the bobbin 60 and, in particular, the convergent sidewalls 92 (FIG. 5), the axial members 106, formed during the overmolding process, bind the stators 52 and the bobbin 60 together.

In addition, the free ends 107 of the axial members 106 are slightly chamfered as best shown in FIG. 7 to facilitate assembly of the sensor 20 to a wheel bearing assembly 22 by an automated manufacturing process. In particular, in order to assemble the sensor 20 a wheel bearing assembly 22, it is necessary that the inner diameter 88 of the bobbin 60 be disposed concentric with respect to the ferrous target wheel 46 within the wheel hub 30. In order to compensate for axial misalignment between the bobbin inner diameter 88 and the ferrous target wheel 46, the chamfered-free ends 107 of the axial members 106 tend to guide the sensor 20 into proper axial alignment with the ferrous target 46, which greatly facilitates assembly of the sensor to a wheel bearing assembly 22 by an automated manufacturing process.

The overmolding process closes one end of the bobbin 60. In particular, the interconnecting member 64 (FIG. 6) may be formed as a disc-like member which interconnects the sensor sub-assembly 58 and enables the ends of the output terminals 66 to extend outwardly therefrom for connection to the electrical connector 40 defining a terminal side 109 and a sensor side 113 of the sensor sub-assembly 58 as shown.

The overmold may also be used to provide features for radially orientating the sensor sub-assembly 58 relative to the end cap 42, as well as securing the sensor sub-assembly 58 thereto, as well as providing a double seal to double protect a sensor sub-assembly 58 from moisture and contaminants. In particular, the interconnecting member 64 can be formed with an outwardly extending boss 110 (FIG. 7) on one side. The boss 110 is oriented so as to circumscribe the extending ends of the output terminals 66 to further seal the sensor sub-assembly 58. An annular shoulder 111 formed by the boss 110 defines a seat for an O-ring 112 which provides a seal for the output terminal 66. The boss 110 and the O-ring 112 are formed with a diameter selected to form a snug fit with an integrally formed well 114 (FIG. 8) in the end cap 42. In addition, in order to provide additional sealing of the sensor 20, the sensor side 109 of the variable reluctance sensor 20 may be sealed with a suitable potting material, such as epoxy, for example, as disclosed generally in U.S. Pat. No. 4,289,722, hereby incorporated by reference. In an alternate embodiment, it is contemplated that the housing 42 can be formed by overmolding it to the sensor sub-assembly 58. This would eliminate the need for a separate molded housing as well as the O-ring seal.

Figure 15:
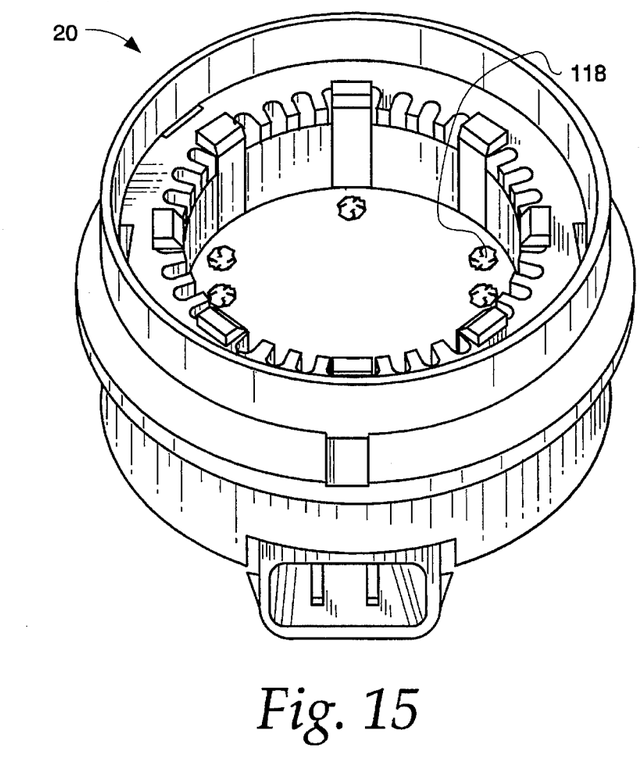
FIG. 15 is a perspective view of an assembled sensor in accordance with the present invention.

In order to facilitate the assembly of the sensor sub-assembly 58 to the end cap 42, the interconnecting member 64 is provided with a plurality of apertures 116 (FIG. 8). These apertures 116 are adapted to receive outwardly extending molded plastic studs 118 formed in an interior portion of the end cap 42. In particular, once the sensor sub-assembly 58 is inserted into the end cap 42 such that the plastic studs 118 are received in the apertures 116 in the interconnecting member 64, the ends of the plastic studs 118 can be mushroomed by either ultrasonic welding or with heat, as shown in FIG. 15, to secure the sensor sub-assembly 58 to the end cap 42.

The end cap 42 may be formed as a molded plastic cup-like member which includes the receptacle portion 44, well portion 114 and the plastic studs 118. The end cap 42 can be formed from a molded plastic material, such as polyphenylene sulphide. Other materials may also be used for the end cap 42, such as cold-rolled steel, stainless steel, etc. The sensor 20, as described, is adapted to be utilized on a wheel-bearing assembly for a non-drive wheel. However, the principles of the invention are also applicable to wheel-beating assemblies for driver wheels. In these applications, the interconnecting member 64 and the end cap 42 would be formed with a through-hole (not shown).

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A variable reluctance sensor adapted to sense a moving magnetic target and provide an output signal as a function of the relative speed of said target relative to said sensor, said variable reluctance sensor comprising:

a bobbin formed from a permanent magnet material by injection molding;

one or more stators, disposed adjacent said bobbin;

a coil of wire wound around said magnetic bobbin, defining a pair of coil ends; and     a pair of output terminals electrically connected to said coil ends, wherein said magnetic bobbin is formed in a ring-like structure with a central bore defining an inner diameter and an annular groove for receiving said coil of wire, said magnetic bobbin including means for facilitating radial orientation of the magnetic bobbin in a mold during assembly of the variable reluctance sensor, wherein said facilitating means includes a V-shaped notch adapted to capture a pin disposed in the mold.

2. A variable reluctance sensor adapted to sense a moving magnetic target and provide an output signal as a function of the relative speed of said target relative to said sensor, said variable reluctance sensor comprising:

a bobbin formed from a permanent magnet material by injection molding forming a magnetic bobbin, wherein said bobbin is formed in a ring-like structure with a central bore defining an inner diameter and an annular groove for receiving a coil of wire and includes means for facilitating radial orientation of the bobbin in a mold during the assembly of the variable reluctance sensor;

one or more stators disposed adjacent said magnetic bobbin;

a coil of wire wound around said magnetic bobbin defining a pair of coil ends; and a pair of output terminals electrically connected to said coil ends.

3. A variable reluctance sensor as recited in claim 2, wherein a predetermined number of axial grooves are formed in the inner diameter of said bobbin.

4. A variable reluctance sensor as recited in claim 3, wherein said predetermined number is selected to correspond with the number of notches in said stator.

5. A variable reluctance sensor as recited in claim 3, wherein said predetermined number of axial grooves in said inner diameter of said bobbin are formed in a generally C-shape defining a bight portion and two depending sidewall portions, said depending sidewall portions being convergent.

6. A variable reluctance sensor as recited in claim 5 further including means for facilitating axial alignment of said central bore with a target wheel.

7. A variable reluctance sensor as recited in claim 6, wherein said facilitating means includes a plurality of axial members extending outwardly from one side of said bobbin defining a plurality of free ends of said members.

8. A variable reluctance sensor as recited in claim 7, wherein said free ends are chamfered.

9. A variable reluctance sensor adapted to sense a moving magnetic target and provide an output signal as a function of the relative speed of said target relative to said sensor, said variable reluctance sensor comprising:

a bobbin formed from a permanent magnet material by injection molding, wherein said bobbin is formed in a ring-like structure with a central bore defining an inner diameter and an annular groove for receiving said coil of wire;

one or more stators disposed adjacent said bobbin, each stator being formed in a ring-like shape formed with a plurality of alternating teeth and notches about its periphery;

a coil of wire wound around said bobbin, defining a pair of coil ends; and a pair of output terminals electrically connected to said coil ends, wherein said bobbin and said stator include means for facilitating radial orientation of said stator relative to said bobbin and wherein said bobbin is formed with an axially outwardly extending tab and said stator is formed with a corresponding notch for receiving said tab when said stator and bobbin are in proper radial orientation with respect to each other.

10. A variable reluctance sensor adapted to sense a moving magnetic target and provide an output signal as a function of the relative speed of said target relative to said sensor, said variable reluctance sensor comprising:

a bobbin formed from a permanent magnet material by injection molding forming a magnetic bobbin;

one or more stators disposed adjacent said magnetic bobbin;

a coil of wire wound around said magnetic bobbin, defining a pair of coil ends;

a pair of output terminals electrically connected to said coil ends;

a housing formed as an end cap and adapted to be received in a wheel hub portion of a wheel bearing assembly; and wherein said bobbin, stators, coil and output terminals are overmolded to close one end of the central bore forming a disc-like interconnecting member defining a sensor sub-assembly with a terminal side on said end and a sensor side of said opposite end.

11. A variable reluctance sensor as recited in claim 10, further including means for securing said sensor sub-assembly relative to said end cap.

12. A variable reluctance sensor as recited in claim 11, wherein said interconnecting member is formed with a plurality of apertures and said end cap is formed with a plurality of plastic studs adapted to be received in said apertures.

13. A variable reluctance sensor as recited in claim 12 further including means for securing said plastic studs relative to said sealing means after said plastic studs are received in said apertures in said interconnecting member.

14. A variable reluctance sensor as recited in claim 10, wherein said interconnecting member is formed with an extending boss for sealing an O-ring and said end cap is formed with a corresponding well for receiving said boss and O-ring and sealing the same.

15. A variable reluctance sensor as recited in claim 10, wherein said sensor side of said sensor sub-assembly is potted.

* * * * *